US009430964B2

(12) United States Patent
Jeong et al.

(10) Patent No.: US 9,430,964 B2
(45) Date of Patent: Aug. 30, 2016

(54) ORGANIC LIGHT EMITTING DISPLAY DEVICE AND METHOD FOR DRIVING THE SAME

(71) Applicant: LG DISPLAY CO., LTD., Seoul (KR)

(72) Inventors: Ui taek Jeong, Seoul (KR); Dae hyeon Park, Andong-si (KR)

(73) Assignee: LG Display Co., Ltd., Seoul (KR)

( * ) Notice: Subject to any disclaimer, the term of this patent is extended or adjusted under 35 U.S.C. 154(b) by 103 days.

(21) Appl. No.: 14/055,539

(22) Filed: Oct. 16, 2013

(65) Prior Publication Data

US 2014/0168192 A1 Jun. 19, 2014

(30) Foreign Application Priority Data

Dec. 17, 2012 (KR) ........................ 10-2012-0147932

(51) Int. Cl.
*G06F 3/038* (2013.01)
*G09G 5/10* (2006.01)
*G09G 3/32* (2016.01)

(52) U.S. Cl.
CPC .......... *G09G 3/3208* (2013.01); *G09G 3/3258* (2013.01); *G09G 2320/0271* (2013.01); *G09G 2320/0295* (2013.01); *G09G 2320/048* (2013.01)

(58) Field of Classification Search
CPC ................. G09G 3/30; G09G 3/3208; G09G 2320/0295
USPC ............................ 345/689, 207, 77; 348/607
See application file for complete search history.

(56) References Cited

U.S. PATENT DOCUMENTS

| | | | | |
|---|---|---|---|---|
| 6,552,735 | B1 | 4/2003 | Dehmlow | |
| 2008/0246699 | A1 | 10/2008 | Oh | |
| 2008/0266216 | A1 | 10/2008 | Choi | |
| 2009/0147032 | A1 | 6/2009 | Kim | |
| 2011/0074750 | A1* | 3/2011 | Leon et al. | 345/207 |
| 2012/0182333 | A1 | 7/2012 | Baba et al. | |
| 2013/0002960 | A1* | 1/2013 | Ryu et al. | 348/607 |

FOREIGN PATENT DOCUMENTS

| | | | |
|---|---|---|---|
| CN | 101295464 | A | 10/2008 |
| CN | 101299321 | A | 11/2008 |
| CN | 101452668 | A | 6/2009 |
| CN | 102667581 | A | 9/2012 |

* cited by examiner

*Primary Examiner* — Andrew Sasinowski
*Assistant Examiner* — Kuo Woo
(74) *Attorney, Agent, or Firm* — Dentons US LLP

(57) ABSTRACT

Disclosed is an organic light emitting display device and a method for driving the same to prevent luminance variations caused by degradation variations, and to prevent picture quality from being deteriorated by residual images caused by the luminance variations. The device includes a display panel having a plurality of sub-pixels, each sub-pixel having an organic light emitting diode; a memory which stores accumulated data of each sub-pixel therein; and a panel driver which accumulates input data of each sub-pixel every accumulation period, stores the accumulated data in the memory, generates a degradation compensation gain value of each sub-pixel, generates modulated data of each sub-pixel by modulating the input data of each sub-pixel in accordance with the degradation compensation gain value of each sub-pixel, converts the modulated data into the data voltage, and supplies the data voltage to each sub-pixel.

14 Claims, 6 Drawing Sheets

ORGANIC LIGHT EMITTING DISPLAY DEVICE AND METHOD FOR DRIVING THE SAME

CROSS REFERENCE TO RELATED APPLICATIONS

This application claims the benefit of the Korean Patent Application No. 10-2012-0147932 filed on Dec. 17, 2012, which is hereby incorporated by reference for all purposes as if fully set forth herein.

BACKGROUND OF THE INVENTION

1. Field of the Invention

Embodiments of the present invention relate to an organic light emitting display device and a method for driving the same. More particularly, the present invention relates to an organic light emitting display device that compensates degradation of an organic light emitting diode, and a method for driving the same.

2. Discussion of the Related Art

With recent development in multimedia, there is an increasing demand for flat panel displays. In order to satisfy this increasing demand, various flat panel displays such as liquid crystal display device, plasma display panel, field emission display device and organic light emitting display device are practically used. Among the various flat panel displays, the organic light emitting display device has been attractive as a next-generation flat panel display owing to advantages of rapid response speed and low power consumption. In addition, the light emitting display can self-emit light, whereby the light emitting display does not cause a problem related with a narrow viewing angle.

Generally, the organic light emitting display device may include a display panel having a plurality of pixels, and a panel driver for driving the respective pixels so as to make the respective pixels emit light. In this case, the pixels are respectively formed in pixel regions, wherein the pixel regions are defined by crossing a plurality of gate lines and a plurality of data lines.

Referring to FIG. 1, each pixel may include a switching transistor (Tsw), a driving transistor (Tdr), a capacitor (Cst), and an organic light emitting diode (OLED).

As the switching transistor (Tsw) is switched by a gate signal (GS) supplied to a gate line (GL), a data voltage (Vdata) supplied to a data line (DL) is supplied to the driving transistor (Tdr).

As the driving transistor (Tdr) is switched by the data voltage (Vdata) supplied from the switching transistor (Tsw), it is possible to control a data current (Ioled) flowing to the organic light emitting diode (OLED) by a driving voltage (VDD).

The capacitor (Cst) is connected between gate and source terminals of the driving transistor (Tdr), wherein the capacitor (Cst) stores a voltage corresponding to the data voltage (Vdata) supplied to the gate terminal of the driving transistor (Tdr), and turns-on the driving transistor (Tdr) by the use of stored voltage.

The organic light emitting diode (OLED) is electrically connected between the source terminal of the driving transistor (Tdr) and a cathode electrode applied with a cathode voltage (VSS), wherein the organic light emitting diode (OLED) emits light by the data current (Ioled) supplied from the driving transistor (Tdr).

Each pixel of the organic light emitting display device according to the related art controls an intensity of the data current (Ioled) flowing to the organic light emitting diode (OLED) by the driving voltage (VDD) through the use of switching of the driving transistor (Tdr) according to the data voltage (Vdata), whereby the organic light emitting diode (OLED) emits light, thereby displaying an image.

However, the organic light emitting diode (OLED), which is necessarily required for the above organic light emitting display device according to the related art, corresponds to an organic matter. Thus, the organic light emitting diode (OLED) is gradually degraded in accordance with the electrical stress and the elapse of time. This degradation of the organic light emitting diode (OLED) may have the nonlinear characteristics, and a level of the degradation may vary depending on the electrical stress. Thus, luminance variations in the neighboring pixels may cause un-uniformity of luminance. Especially, after driving the organic light emitting display device for a long time, a residual image may happen due to the degradation of the organic light emitting diode (OLED).

FIGS. 2 and 3 illustrate luminance changes of the organic light emitting display device according to the related art. FIG. 2 illustrate first to third pixels (P1, P2, P3) to which the different electrical stresses are respectively applied. FIG. 3 is a graph illustrating the luminance changes in the respective first to third pixels (P1, P2, P3), shown in FIG. 2, in accordance with the elapse of time (hours).

In FIG. 2, supposing that the electrical stress applied to the third pixel (P3) is higher than the electrical stress applied to the first and second pixels (P1 and P2), and the electrical stress applied to the first pixel (P1) is higher than the electrical stress applied to the second pixel (P2). As shown in FIG. 3, the respective first, second and third pixels (P1, P2, P3) have the different luminance changes. That is, the luminance change in the third pixel (P3) applied with the highest electrical stress is relatively larger than the luminance change in the first and second pixels (P1 and P2) in accordance with the elapse of time (hours). Due to the variations in the luminance changes of the respective pixels (P1, P2, P3), even though the data voltage is identically applied to the first, second and third pixels (P1, P2, P3), the luminance various may occur due to the degradation variations.

In the organic light emitting display device according to the related art, it is difficult to realize the uniform luminance due to the luminance variations which are caused by the degradation variations. Furthermore, picture quality may be deteriorated due to the residual image by the luminance variations.

SUMMARY OF THE INVENTION

Accordingly, embodiments of the present invention are directed to an organic light emitting display device and a method for driving the same that substantially obviates one or more problems due to limitations and disadvantages of the related art.

An advantage of embodiments of the present invention is to provide an organic light emitting display device which facilitates to prevent luminance variations caused by degradation variations, and to prevent picture quality from being deteriorated by a residual image caused by the luminance variations, and a method for driving the same.

Additional advantages and features of embodiments of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these and other advantages and in accordance with the purpose of the invention, as embodied and broadly described herein, there is provided an organic light emitting display device that may include a display panel having a plurality of sub-pixels, wherein each sub-pixel has an organic light emitting diode which emits light by a data current based on a data voltage; a memory which stores accumulated data of each sub-pixel therein; and a panel driver which accumulates input data of each sub-pixel every accumulation period, stores the accumulated data in the memory, generates a degradation compensation gain value of each sub-pixel on the basis of accumulation difference value between the accumulated data of each sub-pixel and reference accumulated data corresponding to any one from accumulated data of all sub-pixels stored in the memory, generates modulated data of each sub-pixel by modulating the input data of each sub-pixel in accordance with the degradation compensation gain value of each sub-pixel, converts the modulated data into the data voltage, and supplies the data voltage to each sub-pixel.

In another aspect of an embodiment of the present invention, there is provided 6. A method for driving an organic light emitting display device having a display panel provided with a plurality of sub-pixels, wherein each sub-pixel has an organic light emitting diode which emits light by a data current based on a data voltage that may include (A) accumulating input data of each sub-pixel every accumulation period, and storing the accumulated data in a memory; (B) generating a degradation compensation gain value of each sub-pixel on the basis of accumulation difference value between the accumulated data of each sub-pixel and reference accumulated data corresponding to any one of accumulated data of all sub-pixels stored in the memory; (C) generating modulated data of each sub-pixel by modulating the input data of each sub-pixel in accordance with the degradation compensation gain value of each sub-pixel; and (D) converting the modulated data into the data voltage, and supplying the data voltage to each sub-pixel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

On explanation about the embodiments of the present invention, the following details about the terms should be understood.

The term of a singular expression should be understood to include a multiple expression as well as the singular expression if there is no specific definition in the context. If using the term such as "the first" or "the second", it is to separate any one element from other elements. Thus, a scope of claims is not limited by these terms.

Also, it should be understood that the term such as "include" or "have" does not preclude existence or possibility of one or more features, numbers, steps, operations, elements, parts or their combinations.

It should be understood that the term "at least one" includes all combinations related with any one item. For example, "at least one among a first element, a second element and a third element" may include all combinations of the two or more elements selected from the first, second and third elements as well as each element of the first, second and third elements.

Hereinafter, an organic light emitting display device according to embodiments of the present invention and a method for driving the same will be described in detail with reference to the accompanying drawings.

Figure 4:
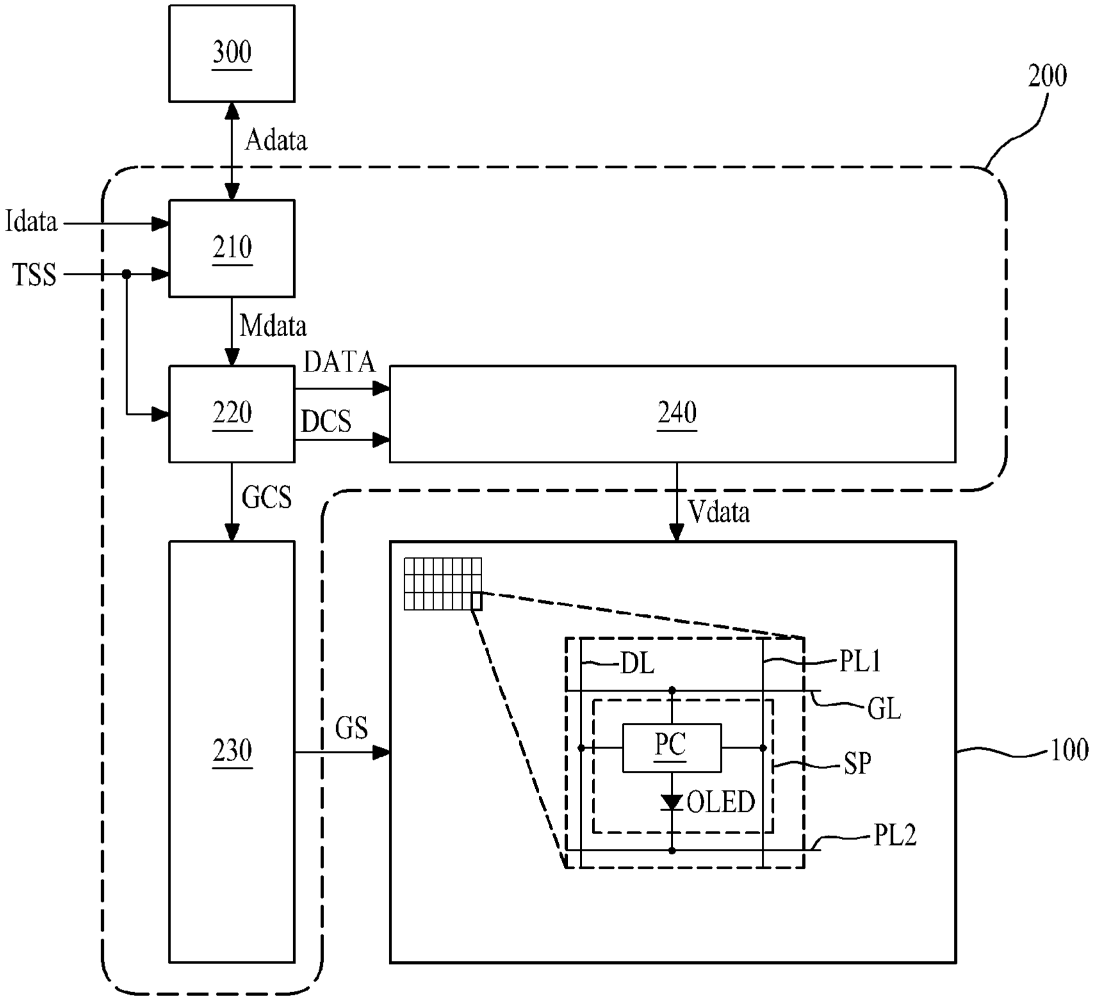
FIG. 4 illustrates an organic light emitting display device according to an embodiment of the present invention.

FIG. 4 illustrate an organic light emitting display device according to an embodiment of the present invention.

Referring to FIG. 4, the organic light emitting display device according to the embodiment of the present invention may include a display panel 100, a panel driver 200, and a memory 300.

The display panel 100 may include a plurality of sub-pixels (SP). The plurality of sub-pixels (SP) are formed in pixel regions which are defined by crossings of a plurality of gate lines (GL) and a plurality of data lines (DL). On the display panel 100, there are a plurality of driving voltage lines (PL1) which are supplied with a driving voltage from the panel driver 200, wherein the plurality of driving voltage lines (PL1) are respectively formed in parallel to the plurality of data lines (DL).

Each of the sub-pixels (SP) may be any one among red, green, blue and white sub-pixels. A unit pixel for displaying an image may comprise adjacent red, green, blue and white sub-pixels. According to another example, a unit pixel for displaying an image may comprise adjacent red, green and blue sub-pixels.

Each of the sub-pixels (SP) may include an organic light emitting diode (OLED) and a pixel circuit (PC).

The organic light emitting diode (OLED) is connected between the pixel circuit (PC) and a second power source line (PL2). The organic light emitting diode (OLED) emits light in proportion to an amount of data current supplied from the pixel circuit (PC), to thereby emit light with a predetermined color. To this end, the organic light emitting diode (OLED) may include an anode electrode (or pixel electrode) connected to the pixel circuit (PC), a cathode electrode (or reflective electrode) connected to the second power source line (PL2), and a light emitting cell formed between the anode electrode and the cathode electrode, wherein the light emitting cell emits any one of red-colored light, green-colored light, blue-colored light and white-colored light. In this case, the light emitting cell may be formed in a deposition structure of hole transport layer/organic light emitting layer/electron transport layer or a deposition structure of hole injection layer/hole transport layer/organic light emitting layer/electron transport layer/electron injection layer. Furthermore, the light emitting cell may include a functional layer for improving light-emitting efficiency and/or lifespan of the organic light emitting layer.

Figure 1:
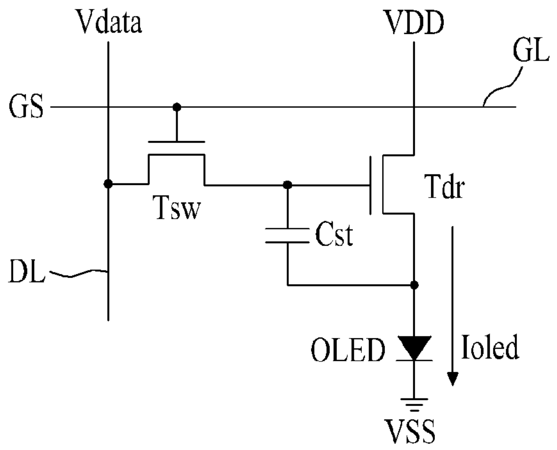
FIG. 1 Related Art
FIG. 1 illustrates a pixel structure of an organic light emitting display device according to the related art.

The pixel circuit (PC) supplies the data current, which corresponds to the data voltage (Vdata) supplied from the panel driver 200 to the data line (DL) in response to a gate signal (GS) of a gate-on voltage level supplied from the panel driver 200 to the gate line (GL), to the organic light emitting diode (OLED). In this case, the data voltage (Vdata) has a voltage value obtained by compensating the degradation characteristics of the organic light emitting diode (OLED). To this end, the pixel circuit (PC) may include a switching transistor, a driving transistor and at least one capacitor, which are formed on a substrate by a process for forming a thin film transistor. The pixel circuit (PC) is identical to that of the related art pixel shown in FIG. 1, wherein a detailed explanation for the pixel circuit (PC) will be omitted.

The panel driver 200 accumulates input data (Idata) every frame or every predetermined period (hereinafter, referred to as 'accumulation period'), and stores the accumulated data in the memory 300; calculates a degradation compensation gain value of each sub-pixel (SP) based on the accumulated data (Adata) of each sub-pixel (SP) stored in the memory 300 every degradation compensation time point, which is preset every frame or every predetermined period, and modulates the input data (Idata) of each sub-pixel (SP) by the use of degradation compensation gain value of each sub-pixel (SP); converts the modulated data (Mdata) of each sub-pixel (SP) into the data voltage (Vdata); and supplies the data voltage (Vdata) to each sub-pixel (SP).

The memory 300 stores the accumulated data (Adata) of each sub-pixel (SP), which is accumulated and added-up every frame or every predetermined period by the panel driver 200, in a unit of each sub-pixel (SP), and supplies the accumulated data (Adata) to the panel driver 200. In this case, the accumulated data (Adata), which is stored in the memory 300, is not initialized, that is, is continuously accumulated while the organic light emitting display device is driven.

The panel driver 200 may include a degradation compensator 210, a timing controller 220, a gate driving circuit 230, and a data driving circuit 240.

The degradation compensator 210 accumulates the input data (Idata) every accumulation period, and stores the accumulated data in the memory 300. Also, the degradation compensator 210 calculates the degradation compensation gain value of each sub-pixel (SP) based on the accumulated data (Adata) of each sub-pixel (SP) stored in the memory 300 every degradation compensation time point; modulates the input data (Idata) of each sub-pixel (SP) by the use of degradation compensation gain value; and supplies the modulated data (Mdata) of each sub-pixel (SP) to the timing controller 220.

The timing controller 220 controls driving timing for each of the gate driving circuit 230 and the data driving circuit 240 in accordance with a timing synchronous signal (TSS) which is input from an external system body (not shown) or external graphic card (not shown). That is, the timing controller 220 generates a gate control signal (GCS) and a data control signal (DCS) on the basis of the timing synchronous signal (TSS) such as vertical synchronous signal, horizontal synchronous signal, data enable signal, dot clock, and etc., controls the driving timing of the gate driving circuit 230 by the gate control signal (GCS), and controls the driving timing of the data driving circuit 240 by the data control signal (DCS).

Also, the timing controller 220 aligns pixel data (DATA) so as to make modulated data (Mdata) of each sub-pixel (SP), supplied from the degradation compensator 210, be appropriate for a pixel arrangement structure, and then supplies the aligned pixel data (DATA) to the data driving circuit 240 on the basis of predetermined interface mode.

The timing controller 220 may include the degradation compensator 210 therein. In this case, the degradation compensator 210 may be provided inside the timing controller 220, wherein the degradation compensator 210 may be provided in a program or logic type.

The gate driving circuit 230 generates the gate signal (GS) corresponding to an image-displaying order on the basis of gate control signal (GCS) supplied from the timing controller 220, and then supplies the generated gate signal (GS) to the corresponding gate line (GL). The gate driving circuit 230 may be formed of a plurality of integrated circuits (IC), or may be directly formed on the display panel 100 during a process for forming the transistor for each sub-pixel (SP), and connected with one side or both sides in each of the plurality of gate lines (GL).

The data driving circuit 240 is supplied with the pixel data (DATA) and the data control signal (DCS) from the timing controller 220, and is also supplied with a plurality of reference gamma voltages from an external reference gamma voltage supplier (not shown). The data driving circuit 240 converts the pixel data (DATA) into the analog-type data voltage (Vdata) by the plurality of reference gamma voltages in accordance with the data control signal (DCS), and then supplies the data voltage (Vdata) to the data line (DL) of the corresponding sub-pixel (SP). The data driving circuit 240 may be formed of a plurality of integrated circuits (IC), and connected with one side or/and both sides in each of the plurality of data lines (DL).

Figure 5:
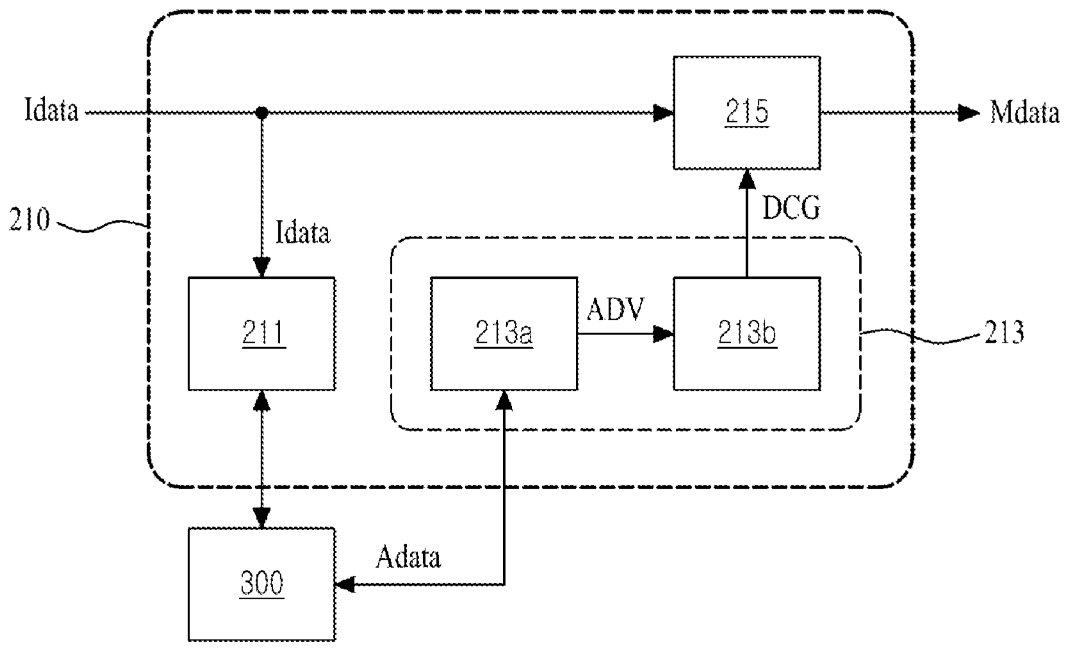
FIG. 5 is a block diagram illustrating a degradation compensator in the organic light emitting display device of FIG. 4 according to the embodiment of the present invention.

FIG. 5 is a block diagram illustrating the degradation compensator in the organic light emitting display device of FIG. 4 according to the embodiment of the present invention.

Referring to FIG. 5, the degradation compensator 210 according to the embodiment of the present invention may include a data accumulator 211, a degradation compensation gain value generator 213, and a data modulator 215.

The data accumulator 211 accumulates the input data (Idata) of each sub-pixel (SP), which is input from the external system body (not shown) or graphic card (not shown), every accumulation period, and then stores the accumulated data in the memory 300. That is, the data accumulator 211 reads the accumulated data (Adata) of the sub-pixel (SP) corresponding to the input data (Idata) provided from the memory 300; accumulates the input data (Idata) on the accumulated data of the corresponding sub-pixel (SP) which is read; and again stores the accumulated data (Adata) of the sub-pixel (SP) accumulated until the current frame in the memory 300.

The degradation compensation gain value generator 213 extracts the maximum accumulated data with the maximum value from the accumulated data of all the sub-pixels (SP) stored in the memory 300 every degradation compensation time point, and sets reference accumulated data by the use of extracted maximum accumulated data. Also, the degradation compensation gain value generator 213 calculates an accumulation difference value between each of the accumulated data of the respective sub-pixels (SP) on the basis of reference accumulated data, and generates the degradation compensation gain value (DCG) of each sub-pixel (SP) in accordance with the calculated accumulation difference value of each sub-pixel (SP). To this end, the degradation compensation gain value generator 213 may include an accumulation difference value calculating part 213*a* and a degradation compensation gain value setting part 213*b*.

The accumulation difference value calculating part 213*a* extracts the maximum accumulated data from the accumulated data of all the sub-pixels (SP) stored in the memory 300 every degradation compensation time point, and sets the reference accumulated data by the use of extracted maximum accumulated data. The accumulation difference value calculating part 213*a* calculates the accumulation difference value (ADV) of each sub-pixel (SP) by calculating the difference value between the preset reference accumulated data and the accumulated data of each sub-pixel (SP). In this case, the accumulation difference value (ADV) of each sub-pixel (SP) is updated with new values by the aforementioned calculating process every degradation compensation time point.

The degradation compensation gain value setting part 213*b* generates the degradation compensation gain value (DCG) of each sub-pixel (SP) according to the accumulation difference value (ADV) of each sub-pixel (SP) supplied from the accumulation difference value calculating part 213*a*. In this case, the degradation compensation gain value (DCG) of each sub-pixel (SP) is set in such a way that a luminance of the sub-pixel having the accumulation difference value is decreased to a luminance of the sub-pixel having the maximum accumulated data. For example, the degradation compensation gain value (DCG) of each sub-pixel (SP) may be set to a real number between 0 and 1. The degradation compensation gain value (DCG) of each sub-pixel (SP) varies according to the accumulation difference value of each sub-pixel (SP), and the degradation compensation gain value (DCG) of each sub-pixel (SP) is newly updated every degradation compensation time point by the aforementioned calculating process.

The degradation compensation gain value setting part 213*b* according to one embodiment of the present invention may set the degradation compensation gain value (DCG) of each sub-pixel (SP) with reference to Look-Up Table obtained by mapping the degradation compensation gain values in accordance with the accumulation difference value.

The degradation compensation gain value setting part 213*b* according to another embodiment of the present invention may set the degradation compensation gain value (DCG) of each sub-pixel (SP) by the use of relations for deriving the degradation compensation gain value in accordance with the accumulation difference value.

As shown above, the degradation compensation gain value (DCG) of each sub-pixel (SP) is provided to determine a modulation level for modulating the input data. According as the accumulation difference value becomes smaller, the degradation compensation gain value (DCG) is set to be larger. Meanwhile, as the accumulation difference value becomes larger, the degradation compensation gain value (DCG) is set to be smaller. In this case, the large accumulation difference value in the first sub-pixel (SP) which is randomly selected means that the organic light emitting diode of the first sub-pixel (SP) is less degraded than the organic light emitting diode of the reference sub-pixel having the maximum accumulated data. If the same data is applied to both the first sub-pixel and the reference sub-pixel, the degradation compensation gain value (DCG) applied to the first sub-pixel (SP) may be set to be relatively smaller than that of the reference sub-pixel due to the relatively-high luminance of the first sub-pixel as compared to the luminance of the reference sub-pixel. On the contrary, the degradation compensation gain value (DCG) applied to the sub-pixel having the small accumulation difference value may be set with the relatively large value.

Hereinafter, a process for deriving the degradation compensation gain value in accordance with the accumulation difference value will be described as follows.

First, the data of each sub-pixel for a test image is displayed on the display panel while being accumulated.

Then, the luminance value of each sub-pixel is measured every degradation compensation time point.

The accumulation difference value of each sub-pixel is calculated with reference to the maximum accumulated data extracted from the accumulated data of all the sub-pixels every degradation compensation time point.

Then, the luminance value of the reference sub-pixel having the maximum accumulated data is compared with the luminance value of each of the remaining sub-pixels, to thereby calculate the luminance deviation in accordance with the accumulated difference value.

Thereafter, the degradation compensation gain value of each sub-pixel for compensating the luminance deviation of each sub-pixel is calculated.

Figure 6:
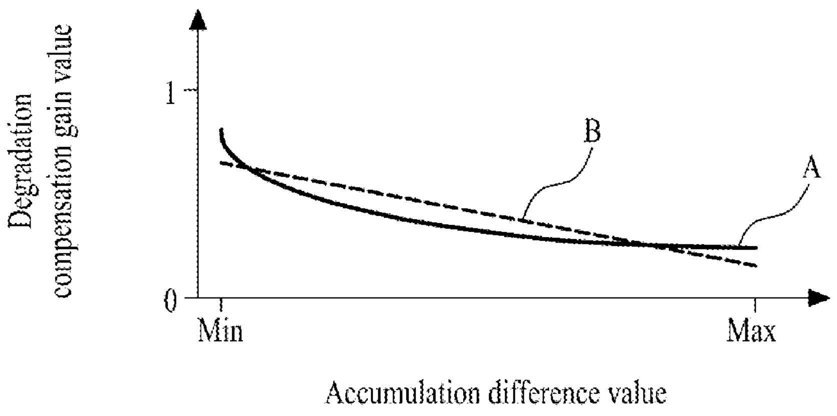
FIG. 6 illustrates a degradation compensation gain value generated in a degradation compensation gain value generator shown in FIG. 5.

As shown in ‘A’ graph of FIG. 6, the degradation compensation gain value is derived in accordance with the accumulation difference value.

As shown in ‘B’ graph of FIG. 6, the relation of the degradation compensation gain value in accordance with the accumulation difference value is finally derived by linearizing the degradation compensation gain value in accordance with the accumulation difference value. This relation may be logic so as to form the degradation compensation gain value setting part 213*b*, or may be provided in type of Look-Up Table obtained by mapping the degradation compensation gain values in accordance with the accumulation difference value.

Thus, the degradation compensation gain value setting part 213*b* sets the degradation compensation gain value (DCG) of each sub-pixel (SP) in accordance with the accumulation difference value of each sub-pixel (SP) every frame or predetermined time period through the use of aforementioned relation or Look-Up Table.

The data modulator 215 generates the modulated data (Mdata) by modulating the input data (Idata) of each sub-pixel (SP) which is input based on the degradation compensation gain value (DCG) of each sub-pixel (SP) supplied from the degradation compensation gain value generator 213. For example, the data modulator 215 may generate the modulated data (Mdata) by multiplying the input data (Idata)

and the corresponding degradation compensation gain value (DCG), but it is not limited to this method. The modulated data (Mdata) may be generated by any one of the four fundamental arithmetic operations such as addition, subtraction, multiplication and division.

Figure 7:
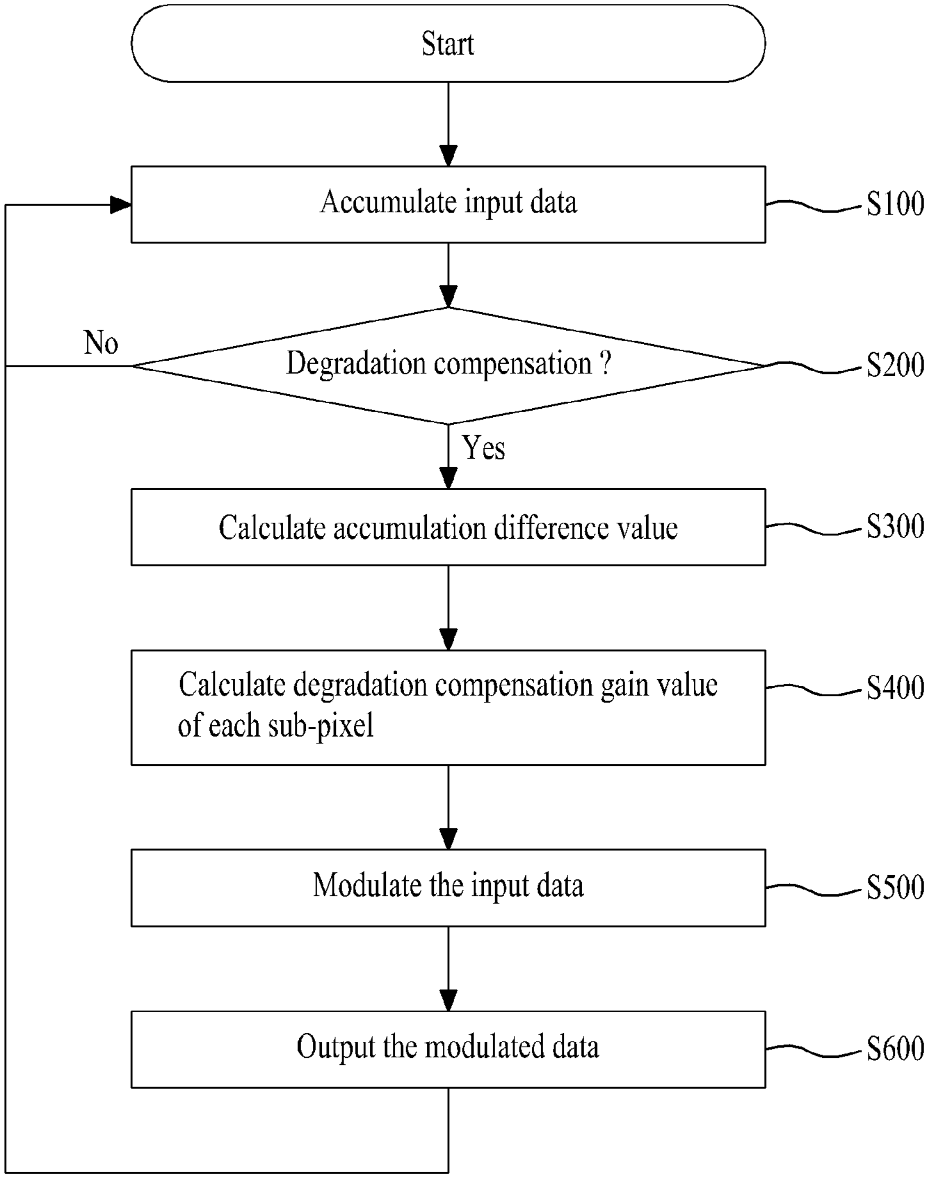
FIG. 7 is a flow chart illustrating a method for driving the organic light emitting display device according to the embodiment of the present invention.

FIG. 7 is a flow chart illustrating a method for driving the organic light emitting display device according to the embodiment of the present invention.

Referring to FIG. 7 in connection with FIGS. 4 and 5, the method for driving the organic light emitting display device according to the embodiment of the present invention will be described as follows.

First, the input data (Idata) of each sub-pixel (SP), which is input from the external system body (not shown) or graphic card (not shown), is accumulated every accumulation period, and is stored in the memory 300 (S100).

Then, it is checked whether or not it is the degradation compensation time point for the organic light emitting diode of each sub-pixel (SP) on the basis of degradation compensation time point which is preset every frame or predetermined period (S200).

In the step S200, if it is not the degradation compensation time point ("No" of S200), the step S100 is performed repeatedly.

In the step S200, if it is the degradation compensation time point ("Yes" of S200), the reference accumulated data is set by extracting the maximum accumulated data having the maximum value from the accumulated data of all the sub-pixels (SP) stored in the memory 300, and the accumulation difference value of each sub-pixel (SP) is calculated by calculating the difference value of each of the respective sub-pixels (SP) with reference to the reference accumulated data (S300).

The degradation compensation gain value (DCG) of each sub-pixel (SP) is generated in accordance with the calculated accumulation difference value of each sub-pixel (SP) (S400).

Then, the modulated data (Mdata) is generated by modulating the input data (Idata) of each sub-pixel (SP) which is input based on the degradation compensation gain value (DCG) of each sub-pixel (SP) (S500).

The modulated data (Mdata) of each sub-pixel (SP) is provided to the timing controller 220 (S600). Accordingly, the modulated data (Mdata) of each sub-pixel (SP) is supplied to the data driving circuit 240 through the timing controller 220, and the modulated data (Mdata) of each sub-pixel (SP) is converted into the data voltage (Vdata) by the data driving circuit 240, and then supplied to the corresponding sub-pixel (SP). Thus, the organic light emitting diode (OLED) of each sub-pixel (SP) emits light by the data current based on the data voltage (Vdata) on which the degradation compensation gain value (DCG) according to the accumulated difference value is reflected.

Figure 2:
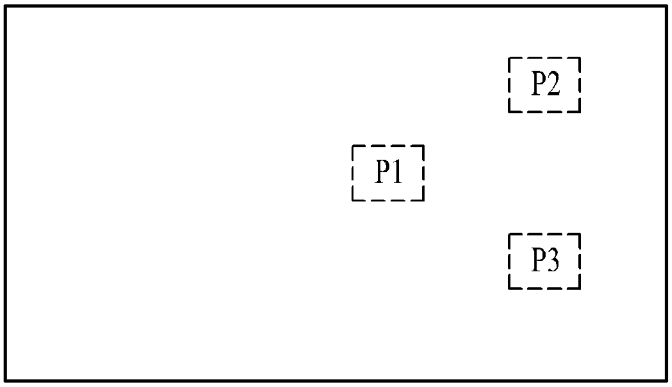
FIG. 2 Related Art
FIGS. 2 and 3 illustrate luminance changes in an organic light emitting diode of the organic light emitting display device according to the related art.
Figure 3:
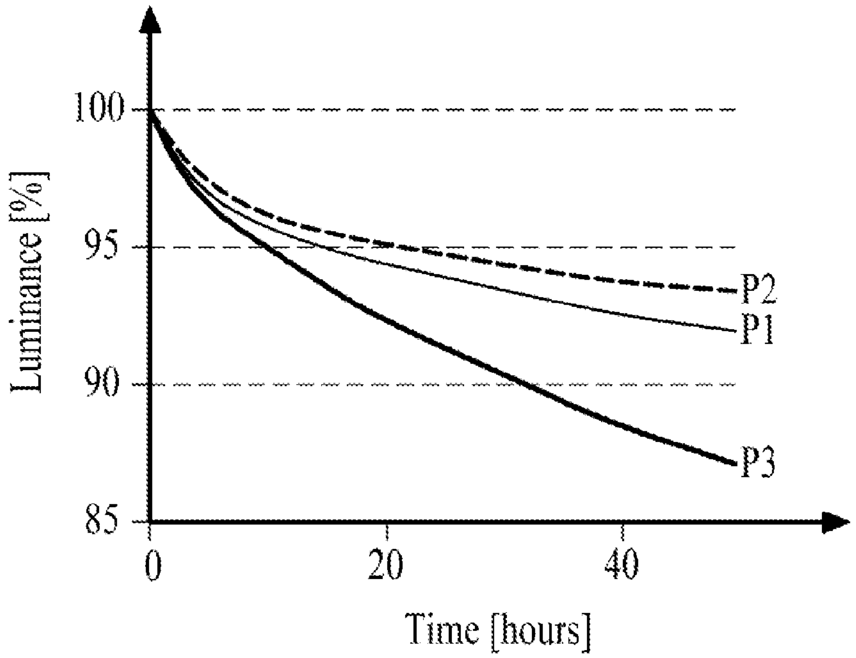
FIG. 3 Related Art
Figure 8:
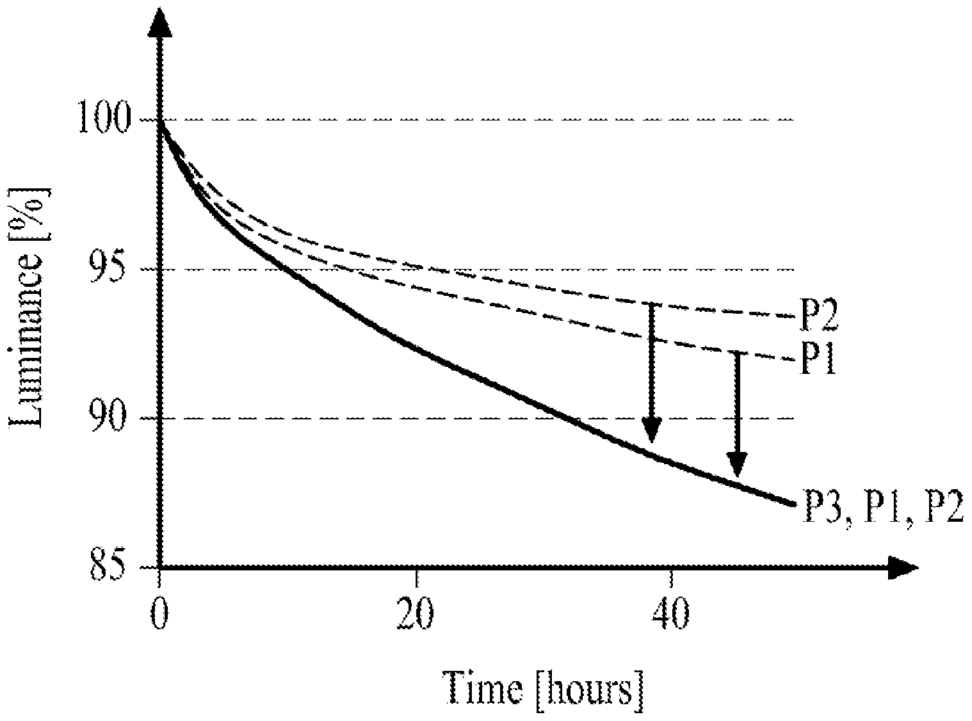
FIG. 8 is a graph illustrating luminance variations of an organic light emitting diode in the organic light emitting display device according to the embodiment of the present invention.

FIG. 8 is a graph illustrating the luminance changes of the organic light emitting diode in the organic light emitting display device according to the embodiment of the present invention, which illustrates the luminance changes in the first to third pixels (P1, P2, P3) shown in FIG. 2 in accordance with the elapse of time (hours).

As shown in FIG. 8, the first to third pixels (P1, P2, P3) respectively have the similar luminance change in accordance with the elapse of time. That is, the degradation compensation gain value (DCG) according to the accumulation difference value is reflected on the input data of each one of the first and second pixels (P1, P2), whereby the luminance in each of the first and second pixels (P1, P2) is decreased to the luminance of the third pixel (P3). Thus, the respective first to third pixels (P1, P2, P3) have the similar luminance in accordance with the elapse of time.

As described above, the organic light emitting display device according to the present invention and the method for driving the same enable to reflect the degradation compensation gain value (DCG) according to the accumulation difference value based on the accumulated data of each sub-pixel (SP) on the input data of each sub-pixel (SP) every degradation compensation time point so that the luminance of each sub-pixel (SP) is individually compensated in accordance with the degradation level of the organic light emitting diode of each sub-pixel (SP). Accordingly, it is possible to prevent the luminance variations from occurring by the degradation variations of the organic light emitting diodes, to prevent a user from perceiving lowering of the luminance occurring at the luminance compensation time point, and to prevent picture quality from being deteriorated by residual images caused by the luminance variations.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An organic light emitting display device comprising:

a display panel having a plurality of sub-pixels, wherein each sub-pixel has an organic light emitting diode which emits light by a data current based on a data voltage;

a memory which stores accumulated data of each sub-pixel therein;

a data accumulator which accumulates input data of each sub-pixel every accumulation period and stores the accumulated data in the memory;

a degradation compensation gain value generator which generates a degradation compensation gain value of each sub-pixel on the basis of an accumulation difference value between the accumulated data of each sub-pixel and a reference accumulated data corresponding to any one from accumulated data of all sub-pixels stored in the memory; and a data modulator which directly reflects the degradation compensation gain value of each sub-pixel to the input data of each sub-pixel to generate modulated data of each sub-pixel, converts the modulated data into the data voltage, and supplies the data voltage to each sub-pixel, wherein the degradation compensation gain value generator extracts a maximum accumulated data from the accumulated data of all the sub-pixels stored in the memory and sets the reference accumulated data to the extracted maximum accumulated data, and wherein a luminance of each sub-pixel having the accumulation difference value is decreased to a luminance of a sub-pixel having the maximum accumulated data.

2. The device of claim 1, wherein the degradation compensation gain value generator calculates the accumulation difference value between the reference accumulated data and the accumulated data of each sub-pixel, and generates the degradation compensation gain value of each sub-pixel in accordance with the accumulation difference value of each sub-pixel.

3. The device of claim 2, wherein a first degradation compensation gain value of a first sub-pixel having a smaller accumulation difference value than a second sub-pixel is larger than a second degradation compensation gain value of the second sub-pixel having a larger accumulation difference value.

4. The device of claim 1, wherein the degradation compensation gain value is set to a real number between 0 to 1.

5. The device of claim 1, wherein the accumulated data is stored in the memory without initializing the memory.

6. The device of claim 1, the accumulation difference value is inversely proportional to the degradation compensation gain value.

7. The device of claim 1, wherein the degradation compensation gain value of each sub-pixel is generated based on a linearization of accumulation difference values.

8. A method for driving an organic light emitting display device having a display panel including a plurality of sub-pixels, wherein each sub-pixel has an organic light emitting diode which emits light by a data current based on a data voltage, comprising:

accumulating input data of each sub-pixel every accumulation period, and storing the accumulated data in a memory;

extracting a maximum accumulated data from the accumulated data of all the sub-pixels stored in the memory;

setting a reference accumulated data to the extracted maximum accumulated data generating a degradation compensation gain value of each sub-pixel on the basis of an accumulation difference value between the accumulated data of each sub-pixel and the reference accumulated data;

generating modulated data of each sub-pixel by directly reflecting the degradation compensation gain value of each sub-pixel to the input data of each sub-pixel; and converting the modulated data into the data voltage, and supplying the data voltage to each sub-pixel, wherein a luminance of each sub-pixel having the accumulation difference value is decreased to a luminance of a sub-pixel having the maximum accumulated data.

9. The method of claim 8, wherein generating a degradation compensation gain value comprises:

calculating the accumulation difference value between the reference accumulated data and the accumulated data of each sub-pixel; and generating the degradation compensation gain value of each sub-pixel in accordance with the accumulation difference value of each sub-pixel.

10. The method of claim 9, wherein a first degradation compensation gain value of a first sub-pixel having a smaller accumulation difference value than a second sub-pixel is larger than a second degradation compensation gain value of the second sub-pixel having a larger accumulation difference value.

11. The method of claim 8, wherein the degradation compensation gain value is set to a real number between 0 to 1.

12. The method of claim 9, wherein the accumulated data is stored in the memory without initializing the memory.

13. The method of claim 9, the accumulation difference value is inversely proportional to the degradation compensation gain value.

14. The method of claim 9, wherein the degradation compensation gain value of each sub-pixel is generated based on a linearization of accumulation difference values.

* * * * *